Nov. 7, 1950      P. C. McLEMORE      2,528,899
APPARATUS FOR FLAME CULTIVATION OF PLANTS
Filed April 16, 1945      2 Sheets-Sheet 1
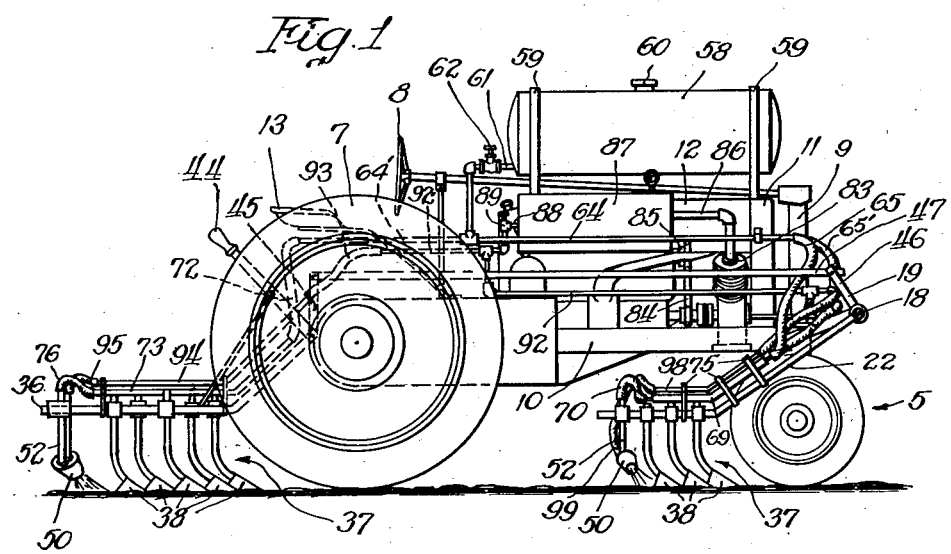
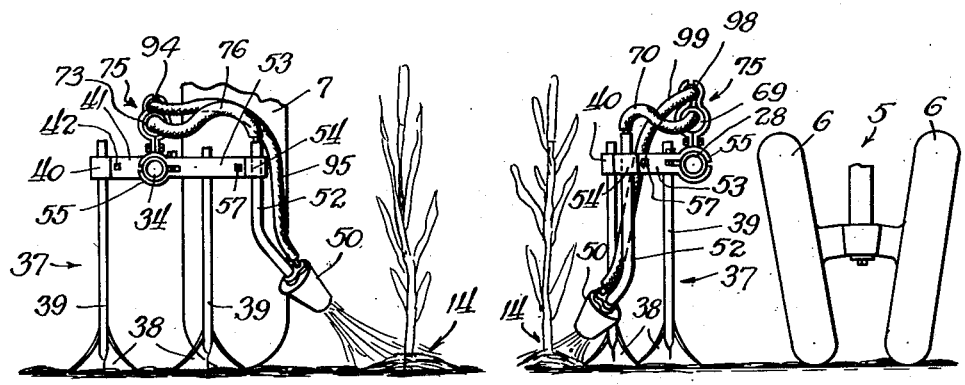
INVENTOR.
Price C. McLemore
BY
Brown, Jackson, Boettcher & Dienner
Attys.

Patented Nov. 7, 1950

2,528,899

UNITED STATES PATENT OFFICE 2,528,899

APPARATUS FOR FLAME CULTIVATION OF PLANTS

Price C. McLemore, Montgomery, Ala.

Application April 16, 1945, Serial No. 588,564

11 Claims. (Cl. 47—1)

The present invention relates to an improvement in an apparatus for flame cultivation of plants.

In my Patent No. 2,327,204, dated August 17, 1943, and my co-pending application Serial No. 364,140, filed November 4, 1940, now Patent 2,408,328 I have disclosed a method and apparatus for the cultivation of crop plants such as cotton, corn, legumes, potatoes, tomatoes, sugar cane, and the like, by the flame method, and my present invention is directed to an improvement in that type of apparatus. However, it will be understood that my present invention in its broader aspects is not limited to the cultivation of row crops, although that is the preferred use of the apparatus hereinafter disclosed.

In the apparatus disclosed in the aforementioned patent and application, the burners for projecting flames to destroy volunteer vegetation about the plants being cultivated are disposed too close to the driver, the engine, and the front wheels of the vehicle carrying the burners with consequent discomfort to the driver and possible injury to the engine and front wheels by the flame.

Further, it has been found desirable under certain circumstances to cultivate the soil or ground surrounding the plants by conventional earth working means such as cultivator shovels while at the same time utilize the method of flame cultivation of my above patent.

In order to overcome the above mentioned disadvantage and attain the above desirable object, I propose to mount upon the cultivator rigs of present known forms of mechanical cultivators having shovels or the like, one or more burners for bathing the ground in flames in the now known manner of flame cultivation. The mounting of a burner or burners upon one or more rigs of conventional mechanical cultivators in the manner hereinafter referred to affords sufficient spacing of the burners away from the driver, the engine, and front and rear wheels of the tractor or other vehicle carrying the cultivator to avoid the aforementioned disadvantage.

The mounting of the burner or burners on the rigs of a mechanical cultivator has the further advantage in providing a floating mounting of the burner or burners relative to the ground level so that the flames thereof are always properly projected upon the ground.

A preferred feature of my invention resides in mounting a burner upon a forward rig of the cultivator in a manner so that the flame of the burner is projected generally laterally away from the front wheels and front end of a vehicle, such as a tractor, providing the motive power for the cultivator.

A further preferred feature of my invention resides in providing a forward rig of the cultivator with a burner, which burner is directed to project a flame generally laterally away from the front wheels and front end of the transporting vehicle, and with a second burner being carried on a rig disposed rearwardly of the rear end of the vehicle, the latter burner being positioned to project a flame in a direction generally laterally toward the vehicle, or 180° from the forward burner. This arrangement of a pair of burners upon forward and rearward rigs of a cultivator provides for flame cultivation of the ground on both sides of the plant row, and further by such arrangement the flames of the forward burner are directed away from the transport vehicle, and the rearward burner is spaced a sufficient distance rearwardly of the operator of the vehicle by the cultivator frame so that the heat of this burner does not cause discomfort to the operator or injury to the vehicle.

The apparatus of the present invention preferably comprises a tractor or other suitable vehicle adapted to travel along the rows of the crop plants, and in which provision is made for mounting a suitable mechanical cultivator, the rigs of which are adapted to carry liquid fuel burners from which flames are projected adjacent to or around the bases of the crop plants. For the cultivation of crop, such as cotton, corn, etc., the tractor and cultivator are preferably of the type capable of straddling two plant rows so that the middle area between plant rows are also acted upon by the mechanical cultivator shovels. However, for the cultivation of trees, high bushes, etc., it will be apparent that various other types of tractors or vehicles may be employed. When my invention is incorporated with a tractor of the type providing for two row cultivation, the forward rigs of the mechanical cultivator are each provided with a burner for projecting flames generally laterally away from the tractor, and the rearward rigs of the mechanical cultivator should preferably be of the type which extend to the other side of the plant row into the middle areas between the next succeeding plant rows and which rearward rigs carry burners projecting flames generally laterally inwardly so that the forward and rearward burners on each side of the tractor provide for mechanical and flame cultivation of the ground of each plant row.

Another preferred feature of my invention resides in the provision of a four row cultivator in which a pair of rigs carrying the earth working means for each side of the outer two rows are mounted one each on the opposite ends of a rig supporting arm extending transversely of the front end of the transporting vehicle. The pair of rigs for each of the outer plant rows are each provided with a burner so mounted on the rigs so that flames are projected laterally inwardly toward the outer rows from either side thereof. The burners carried by the rigs of each pair for the outer row are preferably staggered relative to each other so that the flames thereof do not intersect. It will be apparent, therefore, that the apparatus of my present invention has the utility for use in a two row cultivator, or a four row cultivator for row plants.

Other features and advantages of my present invention will appear from the following detail description of a preferred embodiment of the invention.

Now, in order to acquaint those skilled in the art with the manner of constructing and utilizing an apparatus in accordance with my present invention, I shall describe in conjunction with the accompanying drawings a preferred embodiment of my invention.

In the drawings:

Figure 1 is a side elevational view, more or less diagrammatic, of an apparatus embodying my invention with all of the forward cultivator rigs except the one adjacent the side of the tractor being omitted;

Figure 2 is a partial view of the apparatus of Figure 1 illustrating the relation of the front wheels of a tractor, a rig carried by the tractor, and the burner mounted on the rig;

Figure 3 is a view similar to Figure 2 showing the arrangement at the rear end of the tractor.

Figure 4:
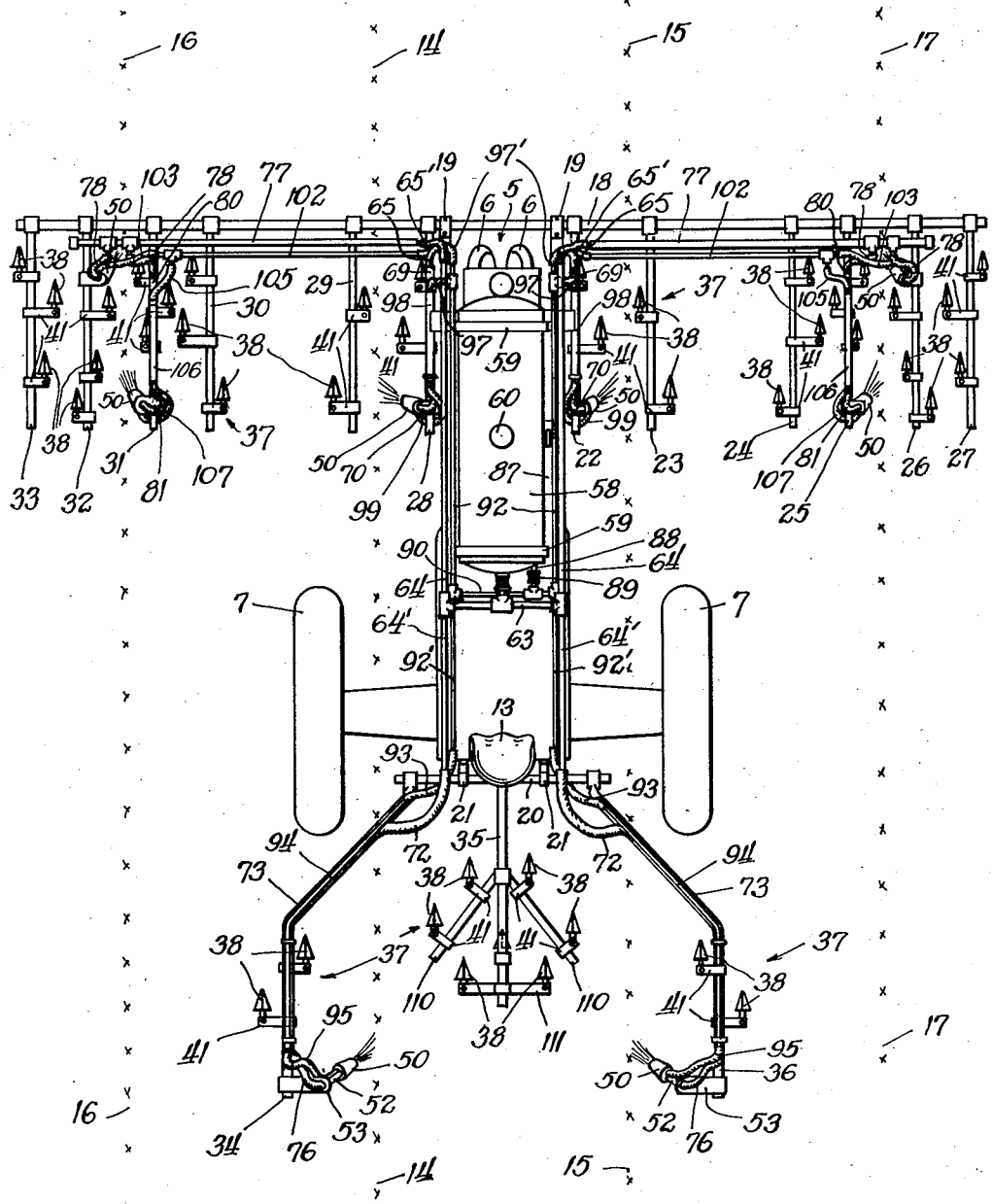
Figure 4 is a plan view of the apparatus shown in Figure 1.

Referring now to Figures 1 through 4, I have shown a tractor of conventional construction with which a four row cultivator has been incorporated and with which I have selected to illustrate my present invention. The tractor shown in the drawings comprises a front wheel means 5 comprising a pair of dirigible wheels 6 at the front of the frame of the tractor and spaced driving wheels 7 at the rear end of the tractor. The front wheel means 5 is steered by suitable steering mechanism including the steering wheel 8 and conventional operating mechanism in the front post 9 to steer the tractor as desired. The front wheels are suitably mounted upon the chassis frame 10 and upon this frame and partly in it is mounted a power plant including an internal combustion engine having suitable fuel supply means, an exhaust pipe and suitable control for governing the starting, stopping and speed of the engine. The tractor is provided with an automatic speed governor for maintaining a fixed speed, as is well known in the art. A cooling system including the radiator 11, is mounted at the front end of the chassis frame and a suitable hood 12, which forms a protection for the engine and houses fuel and water tanks for the engine, extends rearwardly from the top of the radiator 11. The tractor is provided with a suitable seat 13 for the operator, and in convenient position from the seat the usual controls for governing the operation of the tractor are provided. The front wheel means 5 is located on the chassis of the tractor so as to go between a pair of crop rows 14 and 15, and the rear wheels 7 are spaced to go outside the two rows 14 and 15, as will be clear from Figure 4. In the four row cultivator disclosed herein two additional rows such as 16 and 17 may also be cultivated simultaneously with the rows 14 and 15, which rows 16 and 17 extend parallel and laterally of the pair of rows 14 and 15, respectively.

This type of tractor, commonly preferred for agricultural purposes, is equipped with a transverse frame member or forward rig supporting bar 18 extending transversely of the front end of the tractor and is secured thereto by a pair of brackets 19. A frame supporting member or rearward rig supporting bar 20 extends transversely of the rear end of the tractor and is secured to the chassis thereof as by the pair of brackets 21. A plurality of rigs 22 through 27 are supported at one end on the frame supporting member or rig supporting bar 18 at the forward end of the vehicle to extend rearwardly therefrom and laterally of the right side of the tractor as viewed in Figure 4. A plurality of rigs 28 through 33 similar to the rig bars 22 through 27 are carried at one end on the supporting frame bar or rig supporting bar 18 and extend rearwardly therefrom laterally of the left side of the tractor as viewed in Figure 4. The rear frame supporting member or rig supporting cross bar 20 at the rear end of the tractor has three rigs 34, 35 and 36 extending generally rearwardly therefrom. The rig supporting bar 18 and the several rigs 22 through 27, 28 through 33, and 34 through 36, together with the rig supporting bar 20 for the latter rigs are of conventional construction well known in the art, and comprise one suitable form of such members for my present invention. Each of the previously referred to rigs have suitably secured thereto one or more earth working means 37 which are all of substantially like construction and generally comprise a shovel member 38 which is suitably fixed to the lower end of a vertically extending shaft or rod 39, the upper end of which is adapted to be secured in a clamp 40 formed in the outer end of a bracket arm 41, the opposite end of which is suitably secured to a rig. The bracket arms 41 carry a set screw 42 adjacent the clamp portion 40 thereof for adjusting the position of the shovel 38 of the earth engaging means 37 with respect to the ground. As previously noted the ground engaging means 37 carried by the several rigs are all of like construction the only exception being in the length of the several brackets 41 providing for staggering the shovels with respect to each other as shown to fully traverse the ground along the plant rows and middle areas being cultivated. A lever 44 carried by the tractor frame having connection with arms 45, 46 and connecting rod 47 is provided for raising and lowering rigs both forwardly and rearwardly of the tractor. Suitable bracing means may be incorporated for supporting the ground engaging means and rigs in their elevated positions if desired. Also, if desired, suitable power mechanism may be employed to raise and lower the rigs as is well known in the art.

The several rigs are 22 through 27, 28 through 33, as well as rigs 34, 35, and 36 and are mounted to be adjustable axially of the rig supporting rods 18 and 20 so that these rigs may be aligned with the crop rows 14 through 17. Also, if desired, suitable power mechanism, not shown, may also be incorporated providing for mechanical adjustment of the several rigs from the operator's seat, and under control of the operator in a manner now well known in the art.

Certain of the several rigs have burners 50 carried thereby. The burners 50 are all of like construction and each is carried by a pipe 52, as shown in Figures 2 and 3, which is supported by a bracket 53 in a clamp 54 at one end thereof. The bracket 53 at its other end has a clamp 55 for attaching the bracket to a cultivator rig. A set screw 57 adjacent the clamp 54 provides for adjustment of the pipes 52 and the burners 50 vertically relative to the ground.

Fuel for the several burners 50 is stored in a fuel tank 58 supported by brackets 59 on the tractor. In the tractor shown, the brackets are mounted upon the top of the hood 12 although any other suitable preferably elevated position may be employed. The location of the tank 58 is not of importance except that where gravity feed is desired the tank should be suitably elevated. The tank 58 is provided with a filler cap 60, and the tank in the present instance is adapted to feed fuel to the burners by gravity feed. A supply pipe 61 extends from the lower rearward end of the fuel tank 58 rearwardly thereof to a suitable shutoff valve 62 which has connection through a suitable pipe and a T fitting to a cross pipe 63, each end of which connects by means of T fittings with a pair of manifolds 64 and 64' at each side of the tractor extending, respectively, forwardly and rearwardly of the tractor. The forward manifolds 64 at their outer ends are provided with branched flexible hose conduits having branches 65 leading to pipes 69 overlying rigs 22 and 28 and which pipes 69 at their other ends have connection through flexible hose conduits 70 to the pipes 52 for the burners 50 of these rigs of the cultivator. The other branches 65' have connection each with one of a pair of cross pipes 77 extending transversely of the vehicle at the forward end thereof, and which pipes 77 have connection by T fittings with flexible conduits 78. The outer conduits 78 at the outer ends of cross pipes 77, extend to the burners 50 carried by the rigs 26 and 32 as through the pipes 52, as previously described. The inner pair of conduits 78 have connection with pipes 80 from which flexible hose conduits 81 extend to the pipes 52 of the burners 50 carried by rigs 25 and 31.

Flexible conduits 72 extend one from each of the outer ends of the pair of rearward manifolds 64' to pipes 73 which overlie and are secured to the rearward rigs 34 and 36 by suitable bracket means 75 or otherwise, as desired, and from the other end of which pipes 73 suitable flexible conduits 76 extend to the vertical pipes 52 of the rearward burners 50 of the cultivator.

It will thus be observed that the fuel for the burners is carried by the fuel supply tank and is conducted to each of the burners by the conduit system just described. The several burners 50 carried by certain of the rigs are preferably of the torch type and for satisfactory operation thereof a source of air under pressure is desirable.

In the present invention, I provide an air compressor 83 which is adapted to be driven by a drive belt 84 extending from a suitable power takeoff 85 of the tractor. The compressor 83 has connection by a pipe 86 with an air storage tank 87. A suitable air supply line 88 extends from the air storage tank 87 and has connection through a valve 89 to an air cross-pipe 90 which has connection by T's at its opposite ends to manifolds 92 and 92' extending, respectively, forwardly and rearwardly along either side of the tractor. A pair of flexible conduits 93 extend from the rearward ends of the rearward manifolds 92' to pipes 94 which are supported along with the fuel supply pipes 73 by brackets 75. Flexible hose conduits 95 extend from the other ends of pipes 94 to the burners 50 carried on the rigs 34 and 36. The forward manifolds 92 adjacent their forward ends are provided with T fittings from which flexible hose conduits 97 extend to pipes 98 supported in brackets 75 on the rigs 22 and 28. Flexible hose connections 99 extend from the other ends of pipes 98 to the burners 50 carried by rigs 22 and 28. Air cross pipes 102 also have connection with the forward ends of the forward air manifolds 92 by the flexible conduits 97', and which pipes 102 extend laterally of each side of the tractor for conducting air to the burners carried by rigs 25, 26 and 31, 32. Flexible hose connections 103 extend from each outer end of each cross pipe 102 to the burners 50 mounted on rigs 26 and 32, and flexible hose conduits 105 have connection by T fittings at the outer ends of air cross pipes 102 and to pipes 106 mounted on rigs 25 and 31, from which pipes 106 flexible hose conduits 107 extend to the burners 50 carried by rigs 25 and 31.

It will thus be observed that I have provided a separate fuel conduit system for supplying fuel to the several burners 50 and a second conduit system for conducting compressed air to each of the burners. The construction and arrangement of the several manifolds for the fuel and air supply systems are somewhat diagrammatically shown in the drawings, and it will be understood that any suitable piping system and arrangement of conduits may be provided therefor with suitable flexible connections between rigid pipe members to permit raising of the cultivator rigs from the ground in the known manner. The flexible hose connections also provide for adjustment of the several rigs upon the rig supporting frame members 18 and 20 as shown for various crop row spacings. The present invention is not concerned primarily with any specific mounting or arrangement of the rigs, the earth working means carried thereby or the specific mounting of the burners thereto, the only requirements of such mountings and fuel and air line supply connections being that for permitting adjusting of the burners relative to the ground, and adjusting of the rigs transversely of the vehicle so that the tractor and cultivator may be adjusted to cultivate plant row crops in which the rows are of different spacings.

Reference may now be had to Figure 4 in which it will be observed that the rigs 22 and 28 to either side of the forward end of the tractor are each provided with a pair of earth working means such as the shovels 38 previously described, and at their rearward ends each carry a burner 50. The burners 50 carried by the cultivator rigs 22 and 28, as will be observed, are directed to project a flame away from the forward end of the engine of the tractor, and along the inside of the rows of crops 14 and 15. The rearward rigs 34 and 36 are formed to extend angularly outwardly rearwardly of the tractor and across the two crop rows 14 and 15, and it will be observed that each of the rigs 34 and 36 carry a pair of earth working means such as the shovels 38, previously described, and rearwardly at their outer ends are each provided with a burner 50 which is arranged so that it projects a flame along the crop row on the outside thereof. The seat 13 for the operator is thus disposed between the burners at the forward end and the burners at the rearward end with the flame for the burners at the rearward end being projected in a direction toward the vehicle or 180° opposite that of the forward burners 50. The rigs 34 and 36 provide for mounting of the burners 50 a distance sufficiently rearwardly of the tractor so that the heat thereof does not cause discomfort to the operator nor are the flames sufficiently close to any of the mechanism as to cause injury thereto. Thus, by the arrangement of the burners on the rigs 22 and 28 and at the forward end of the tractor and on the rigs 34 and 36 at the rearward end of the tractor both sides of the crop rows 14 and 15 are adapted to be flame cultivated following the earth working means 37 carried by each of the rigs referred to. The rig supporting frame member 20 as previously referred to has the rig 35 connected thereto to extend rearwardly of the vehicle and, in the embodiment shown this rig 35 has a pair of arm members 110 extending angularly outwardly therefrom and each of which carries a pair of earth working means 37. Also a cross bar 111 is carried at the rearward of the rig 35 and it is provided with cultivator shovels 38. The rig 35 is thus positioned relative to the tractor so that with the rigs 34 and 36 extending outwardly along the outside of the crop rows 14 and 15 with the rig 35 lying between the two rows 14 and 15 provision is made for mechanical cultivation of the soil between these two rows.

The present invention thus in its broader aspects contemplates the provision of the two row cultivator which in its preferred form would simply comprise the rigs 22 and 23 to the right side of the tractor, as viewed in Figure 4, the rigs 28 and 29 to the left side of the forward end of the tractor, as viewed in Figure 4, and the rear rigs 34, 35 and 36.

In the embodiment of the invention herein shown, the rig supporting frame member 18 at the forward end of the vehicle has been extended to provide for the supporting of the rigs 24 to 27 at the right hand side thereof as viewed in Figure 4, and the rigs 30 and 33 at the left hand side of the tractor as viewed in this figure. When my invention is to be incorporated with such a four row cultivator I preferably provide the rigs 25 and 26 and the rigs 31 and 32 each with a burner 50 with the burners carried by the rigs 25 and 31 disposed along the inside of the crop rows 16 and 17 and with the burners carried by the rigs 26 and 32, along the outside of the crop rows 16 and 17. The remaining rigs 24, 27 and 30, 33 simply carry the earth working means 37 providing for mechanical cultivation of the middle areas between the crop rows 15—17 and 14—16. In the application of the invention to a four row cultivator it will be observed that the burners for flame cultivating both sides of each of the rows 16 and 17 are mounted forwardly of the vehicle, this arrangement being possible in view of the fact that the burners 50 for cultivating the rows 16 and 17, such as the burners carried by the rigs 26 and 32 are spaced far enough away from the vehicle so that the flames projected thereby can cause no damage.

Each of the burners 50 is preferably of the high pressure atomizing type, such as illustrated and described in my copending application Serial No. 442,206, now issued as Patent No. 2,369,154, dated February 13, 1945, and in the copending application of myself and Valdemar Knudsen, Serial No. 471,858, now issued as Patent No. 2,391,027, dated December 18, 1945. The above Patents No. 2,369,154 and No. 2,391,047 have been reissued under No. 22,803 and No. 22,836, respectively. Hydrocarbon fuel is fed to each burner under pressure preferably in the range of from 40 to 60 pounds per square inch and is projected therefrom in the form of a high pressure jet. The source of compressed air contained within the air tank 87 which is supplied by the compressor 83 is conducted to the several burners through the air supply manifold system previously described in an atomizing relation to the jet of fuel conducted to each of the burners through the fuel supply system extending from the fuel supply tank 58. The fuel can be distillate furnace oil, or any one of the wide range of fuel oils capable of being atomized and burned in the above manner. The high pressure atomizing type of burners is particularly advantageous in effecting flame cultivation of plants because it enables practically any desired length or shape of flame to be obtained, and because it also enables the intensity or temperature of the flame to be adjusted over a relatively wide range. In the cultivation of certain plants it is advantageous to employ a relatively long flame to reach in under the long overhanging branches or foliage of the crop plant. As previously indicated substantial modifications may be made of the fuel supply system and the air supply system and it will be understood that the air supply tank and compressor may be located in any suitable position upon the tractor such as shown and described, for example, in my and Valdemar Knudsen's copending application Serial No. 471,858, now issued as Patent No. 2,391,027, above referred to. Referring now more particularly to Figures 2 and 3, it will be observed that each burner is preferably arranged to have its entire flame or the major portion of its flame impinge against the ground on either side of the plant row, just a few inches short of the plant and, then to fan out over the ground to extend beyond the plant row thereby completely enveloping each plant stem as the tractor travels along the plant rows. Preferably, the burners are arranged to project their flames substantially straight across the plant rows, although if desired the burner may be angled slightly forwardly as indicated in the plan view of Figure 4. In the arrangement shown in the present application it will be observed that no two burners of any pair for flaming either side of a crop row are in line with each other but rather are staggered or offset whereby the flame of one burner is ahead of the flame of the other so that the flames do not intersect with each other but act in succession on each plant.

While I have shown what I consider to be the preferred embodiment of my invention it will be understood that it is merely exemplary and that various modifications and rearrangements may be made therein without departing from the spirit and scope of the invention.

I claim:

1. A flame cultivator attachment adapted to be connected to a vehicle comprising a cultivator rig adapted to be mounted on said vehicle to extend laterally thereof for travel along a crop row and carrying an earth working means, adapted to have engagement with the ground, and a burner supported on said rig above the ground level for projecting a flame upon the ground in a direction generally laterally away from said vehicle and inwardly of the crop row, said burner being adapted to float relative to the ground level by the engagement of the earth working means with the ground.

2. In an apparatus of the class described, a frame adapted to be moved along adjacent crop rows, cultivator rigs mounted on said frame extending laterally thereof at its forward and rearward ends and adapted to be disposed at either side of a crop row, earth working means mounted in fixed relation on said cultivator rigs, and burners mounted on said cultivator rigs for projecting flames inwardly of a crop row, said burners being adapted to float relative to the ground level by the engagement of the earth working means with the ground.

3. In an apparatus of the class described, a frame adapted to be moved along adjacent crop rows, frame members mounted on said frame extending laterally of the forward and rearward ends thereof, a burner mounted on the frame member at the forward end of said frame for projecting a flame in a direction generally laterally away from said frame and inwardly of a crop row, and a burner mounted on the frame member at the rearward end of said frame for projecting a flame in a direction generally opposite that of the first named burner and inwardly of a crop row.

4. In an apparatus of the class described, a frame adapted to be moved along adjacent crop rows, cultivator rigs mounted on said frame extending laterally thereof at its forward and rearward ends, earth working means mounted on said rigs, a burner mounted on the cultivator rig at the forward end of said frame mounted for projecting a flame in a direction generally laterally away from said frame and inwardly of a crop row, and a burner mounted on the rig at the rearward end of said frame for projecting a flame in a direction generally opposite that of the first named burner and inwardly of a crop row.

5. A flame cultivator attachment adapted to be connected to a tractor comprising means including a pair of cultivator rigs for mounting the latter on the forward end of said tractor with each one of said cultivator rigs being adapted to extend laterally at either side of said tractor, earth working means mounted in fixed relation on said cultivator rigs, and burners carried by said cultivator rigs and disposed thereon to project flames in a direction away from said tractor, said burners being adapted to float relative to the ground level by the engagement of the earth working means with the ground.

6. In an apparatus of the class described, a frame adapted to be moved along adjacent crop rows and rear wheels adapted to straddle said adjacent pair of crop rows, means including a pair of first cultivator rigs for mounting the latter at the forward end of said frame with one each of said cultivator rigs extending laterally of the frame on either side thereof, earth working means carried by said first cultivator rigs, burners carried by said cultivator rigs and disposed thereon to project flames in a direction away from said frame and inwardly of one side of said crop rows, means including a pair of second cultivator rigs for mounting the latter at the rearward end of said frame, earth working means carried by said second cultivator rigs, and burners carried by said second cultivator rigs and disposed thereon to project flames in a direction opposite to that of the first named burners and inwardly of the other side of said crop rows.

7. In an apparatus of the class described, a frame adapted to be moved along an adjacent pair of crop rows and rear wheels adapted to straddle the adjacent pair of crop rows, a rig supporting member mounted on said frame to extend transversely of the forward end thereof, cultivator rigs mounted on said rig supporting member to extend laterally of the forward end of said frame and on the inner side of each of said adjacent pair of crop rows, and on both sides of the crop row adjacent each of said pair of crop rows, a second rig supporting member mounted on said frame to extend transversely of the rearward end thereof, second cultivator rigs mounted on said second rig supporting member to extend laterally and rearwardly of the rearward end of said frame on either side of said adjacent pair of crop rows, earth working means carried by said first and second rigs, first burners carried by the rigs at the inner sides of said adjacent pair of crop rows and disposed thereon to project flames in a direction away from the forward end of said frame and inwardly of one side of said adjacent pair of crop rows, second burners mounted on the rigs at the rearward end of said frame and disposed thereon to project flames in a direction opposite said first burners and inwardly of the other side of said adjacent pair of crop rows, and a plurality of third burners carried by the rigs extending laterally of each side of the crop rows adjacent each of said pair of crop rows and disposed thereon to project flames in a direction inwardly from both sides of the former crop rows.

8. A flame cultivator attachment adapted to be connected to a vehicle having front wheel means adapted to travel between an adjacent pair of crop rows, comprising a frame member adapted to be mounted on said vehicle to extend transversely of the forward end thereof, a pair of first cultivator rigs mounted on said frame member with one each of said first cultivator rigs extending laterally of either side of said vehicle between the sides thereof and said crop rows, earth working means fixedly mounted on said first cultivator rigs, burners mouned on said first cultivator rigs and disposed thereon to project flames in a direction away from said vehicle and inwardly from one side of said pair of crop rows, pairs of second cultivator rigs disposed laterally outwardly of each of said first cultivator rigs and between the outer ends of said frame member and being arranged to straddle a crop row to either side of said pair of crop rows, earth working means fixedly mounted on said second cultivator rigs, and burners carried by said second cultivator rigs and angularly arranged thereon so that said burners project flames inwardly of each side of each of said crop rows on either side of said pair of crop rows.

9. In an apparatus of the class described, a support, frame members mounted on said support extending laterally of the forward and rearward ends thereof, a burner mounted on the frame member at the forward end of said support to project a flame in a direction generally away from said support, a burner mounted on the frame member at the rearward end of said support to project a flame in a direction opposite that of the first named burner, a fuel supply tank carried by said support for supplying said burners, and an air compressor carried by said support for supplying air under pressure to said burners.

10. In an apparatus of the class described, a support, cultivator rigs mounted on said support to extend laterally of the forward and rearward ends thereof, earth working means mounted on said rigs, a burner mounted on the cultivator rig at the forward end of said support for projecting a flame in a direction away from said support, a second burner mounted on the rig at the rearward end of said support for projecting a flame in a direction opposite that of the first named burner, fuel supply means carried by said support, means providing a source of air under pressure carried by said support, conduit means between said fuel supply means and said burners for conducting fuel from the former to the latter, and conduit means between said means providing a source of air under pressure and said burners for conducting air from the former to the latter.

11. In an apparatus of the class described, the combination of a frame member adapted to be moved along a crop row, earth working means mounted on said frame member and supporting the latter for movement relative to the ground level, and a burner supported on said frame member above the ground level for projecting a flame upon the ground inwardly of the crop row, whereby said burner is adapted to move relative to the ground level by the engagement of earth working means with the ground.

PRICE C. McLEMORE.

REFERENCES CITED

The following references are of record in the file of this patent:

UNITED STATES PATENTS

| Number | Name | Date |
|---|---|---|
| 659,870 | Jones | Oct. 16, 1900 |
| 1,088,969 | Cox | Mar. 3, 1914 |
| 1,399,229 | Servoss | Dec. 6, 1921 |
| 1,458,070 | Long | June 5, 1923 |
| 1,509,340 | Corson | Sept. 23, 1934 |
| 1,755,806 | Benjamin | Apr. 22, 1930 |
| 2,008,891 | Woods | July 23, 1935 |
| 2,327,204 | McLemore | Aug. 17, 1943 |